(United States Patent — Carlsson et al.)

Patent Number: 4,701,265
Date of Patent: Oct. 20, 1987

[54] CHLORINATING APPARATUS

[75] Inventors: H. Roger Carlsson, Täby; Stephan Schwartz, Vaxholm; Mats Hållberg, Sollentuna, all of Sweden

[73] Assignee: Electrocell AB, Åkersberga, Sweden

[21] Appl. No.: 867,444

[22] Filed: May 29, 1986

[30] Foreign Application Priority Data

May 29, 1985 [SE] Sweden ................. 8502652

[51] Int. Cl.$^4$ .......................... E04H 3/20; C25B 9/00
[52] U.S. Cl. ................................. 210/744; 210/748; 210/754; 210/169; 210/177; 210/192; 210/198.1; 204/278
[58] Field of Search ............... 210/123, 169, 177, 192, 210/205, 198.1, 744, 748, 754; 204/98, 128, 275, 278

[56] References Cited

U.S. PATENT DOCUMENTS

| | | | |
|---|---|---|---|
| 1,777,987 | 10/1930 | Wallace | 137/100 |
| 2,269,393 | 1/1942 | Crampton | 210/754 |
| 3,351,542 | 11/1967 | Oldershaw et al. | 210/754 |
| 3,669,857 | 6/1972 | Kirkham et al. | 210/192 |
| 4,229,272 | 10/1980 | Yates | 210/754 |
| 4,381,240 | 4/1983 | Russell | 210/754 |

Primary Examiner—Benoit Castel
Assistant Examiner—Richard D. Jordan
Attorney, Agent, or Firm—Burns, Doane, Swecker & Mathis

[57] ABSTRACT

An apparatus for chlorinating swimming bath water, includes an electrochemical cell (2) with an anolyte chamber (25) and a catholyte chamber (22), which are separated by an ion-selective diaphragm (290), a metering device (7) for supplying consumption hydrochloric acid to the cell (2), a chlorine gas outlet from the upper space (26) of the anolyte chamber (25), a chlorine gas pipe (29) for transferring chlorine gas from the cell (2), to a circulation pipe (15) for the bath water, an ejector (10) connecting the chlorine gas pipe (29) to the bath water pipe (15). The ejector (10) is adapted to generate a pressure in the chlorine gas pipe (29) which is lower than atmospheric pressure, and a gas flow in the gas pipe (29) which is greater than the greatest chlorine gas production flow of the cell (2). An atmospheric air pipe (35,45) communicates with the chlorine gas pipe (29). A liquid trap device (3) is arranged in the air pipe. There is a liquid overflow outlet (40) on the low pressure side of the liquid trap device. There are means for feeding a liquid such as a cooling liquid for the cell (2) through the liquid chamber (31) of the liquid trap device to, and through its overflow outlet (40). Sensing means (43,44) sense the liquid level in the liquid trap device on its high and/or low pressure side, said means (43,44) being adapted to inhibit the chlorine production of the cell (2) if the sensed liquid level deviates from a previously detemined level (N1;N2).

20 Claims, 1 Drawing Figure

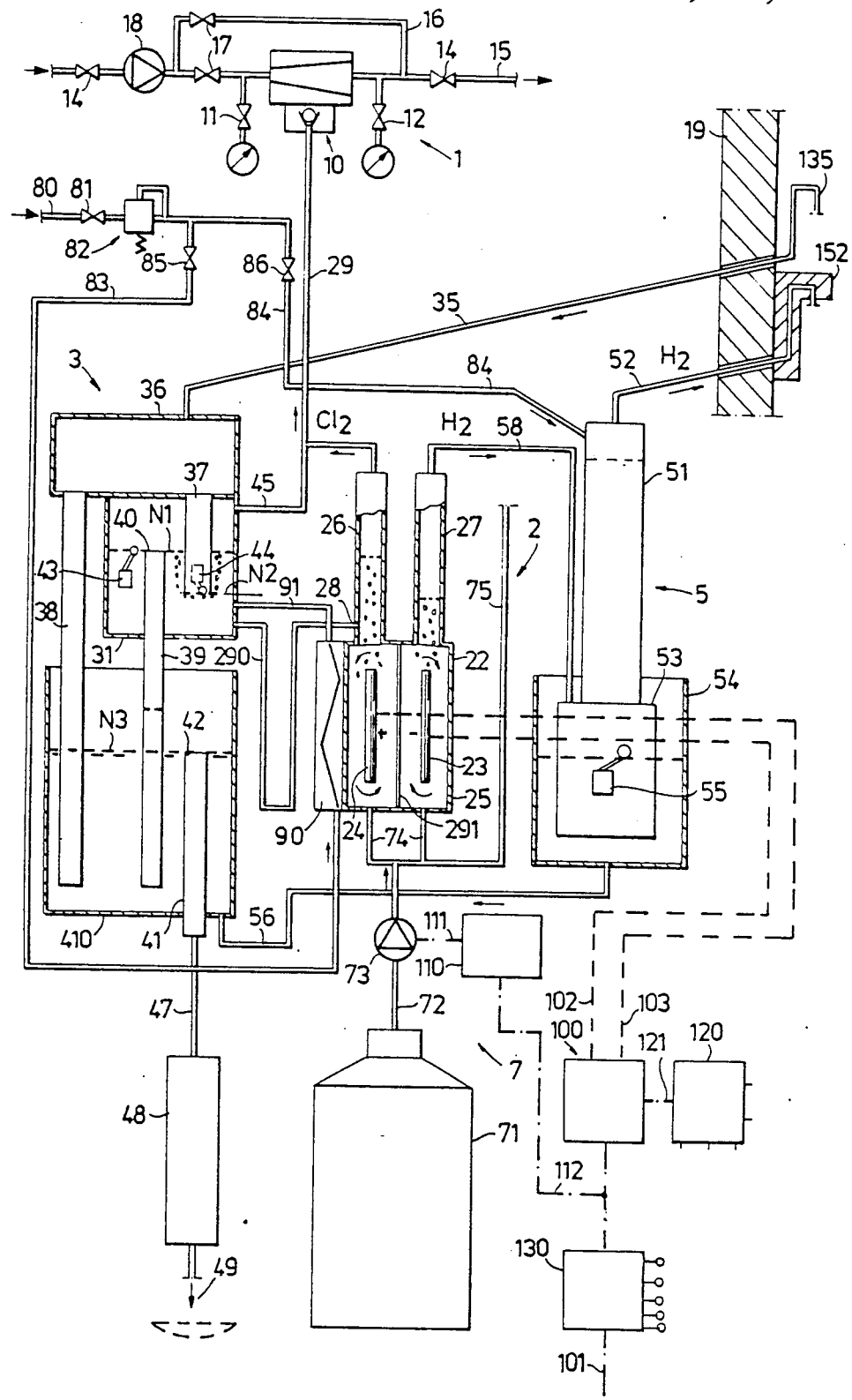

CHLORINATING APPARATUS

TECHNICAL FIELD

The invention relates to an apparatus for chlorinating a liquid such as water, including an electrochemical cell with an anolyte chamber and a catholyte chamber which are separated by an ion-selective diaphragm, a metering device for supplying consumption hydrochloric acid to the cell, a chlorine gas outlet from the upper space of the anolyte chamber, a chlorine gas pipe for transferring chlorine gas from the chlorine gas outlet to a pipe for liquid which is to be chlorinated, and a feed device connecting the chlorine gas pipe to the liquid pipe.

BACKGROUND

In chlorinating equipment such as that for chlorinating the water in swimming baths and the like, it is important to provide safety equipment which largely reduces the risks of unintentional chlorine release into the surroundings of the equipment. Such safety devices included in the safety equipment include a plurality of monitors which inhibit chlorine gas production if there is malfunction in the equipment. Since the equipment must be provided with a plurality of monitors, and since the monitors conventionally must be set for reacting to small sensing values, the safety equipment can easily show malfunction. One object of the invention is therefore to provide chlorinating apparatus of the indicated kind, where the safety devices may be made robust and actuable by comparatively large regulating magnitudes. A further object is to provide an apparatus construction which reduces the risks of an unintentional chlorine release from the apparatus due to malfunction of the safety system.

Further objects and advantages of the invention will be seen from the following, or will be understood by one skilled in the art.

CHARACTERIZATION OF THE INVENTION

An apparatus for chlorinating a liquid such as water, includes an electrochemical cell with an anolyte chamber and a catholyte chamber, which are separated by ion-selective diaphragm, a metering device for supplying consumption hydrochloric acid to the cell, a chlorine gas outlet from the top space of the anolyte chamber, a chlorine gas pipe for transferring chlorine gas from the chlorine gas outlet to a pipe for the liquid which is to be chlorinated, a feed device which connects the chlorine gas pipe to the liquid pipe, and is substantially distinguished in that the feeding device is adapted to generate a pressure in the chlorine gas pipe which is lower than atmospheric pressure, and also to generate a gas flow in the chlorine gas pipe which is greater than the greatest chlorine gas production flow of the cell, an atmospheric air pipe communicating with the chlorine gas pipe, a liquid trap device in the air pipe, a liquid overflow outlet on the low pressure side of the liquid trap device, means for feeding a liquid through the liquid chamber of the liquid trap device to, and through its overflow outlet, and sensing means for sensing the liquid level in the liquid trap device, the means being adapated to inhibit the cell chlorine production if the sensed liquid level deviates from a predetermined level. With the aid of the proposed implementation of the apparatus, the chlorine gas system always has a pressure which is lower than atmospheric pressure. The sensing means monitors the pressure of the chlorine gas system and interrupts current supply to the cell if the pressure should rise. A rise in pressure in the chlorine gas pipe or in the air vent pipe downstream of the water trap device constitutes an indication of leakage in the chlorine gas system. By ensuring that the feed device (an ejector or an injecting pump) has a suction flow which is greater than the greatest possible chlorine gas production of the cell, and by taking atmospheric air into the chlorine gas line via a water trap, the sub-pressure in the chlorine gas system is ensured. Since the liquid level in the liquid trap device directly indicates the pressure level in the chlorine gas system, the sensing means may comprise a robust float-controlled monitor. If, for some reason, this monitor malfunctions when the chlorine gas system pressure rises to, and above atmospheric pressure, the chlorine gas can depart via the water trap device and out through the air intake pipe. The inlet of the air intake pipe is suitably arranged outside the premises where the chlorinating apparatus is placed.

The upper part of the anolyte chamber may have an anolyte overflow outlet communicating with the liquid chamber of the liquid trap device. The cell may have a heat exchanger for cooling it, said exchanger having a cooling liquid such as tap water flowing through it, the cooling liquid outlet of the heat exchanger then communicating with the water chamber of the water trap device.

Hydrochloric acid (about 1% concentration) is electrolysed in the electrochemical cell to chlorine gas and hydrogen gas. Circulation of the electrolyte is driven by the gas generation at the anode and cathode, respectively, this being the so-called gas lift effect. The circulation volume is placed internally in the cell. The hydrochloric acid with a concentration of 30%, for example, is pumped into the cell by a metering pump, mixed with the acid in the cell and consumed. Substantially the same liquid volume as pumped into the cell flows out through the anolyte outlet and is mixed with the liquid in the water trap device. The electrolyte level in the cell is kept substantially constant.

Hydrogen gas formed in the cell is vented out to the atmosphere via a water scrubber. The water scrubber removes chlorine gas and possible acid mist from the hydrogen gas with the aid of a water flow, e.g. a tap water flow.

The liquid trap device includes to advantage a closed vessel having the mentioned liquid overflow outlet and furthermore an air inlet stub opening out into the vessel at a level under the liquid overflow outlet for communication with a first part of the air inlet pipe, which is upstream of the liquid trap device, there being a second part of the air inlet pipe situated downstream of the liquid trap device connected to the vessel above the level of the liquid overflow outlet. The liquid overflow outlet of the closed vessel can communicate with a liquid pipe opening out into a second vessel through which liquid flows, and which is situated at a substantially lower level than the closed first vessel. In such a case, the second vessel may have a second liquid overflow outlet to which a de-acidifying filter is connected. The mentioned first part of the air pipe suitably has as branch pipe opening out into the second vessel at a level under the level of the overflow outlet in this vessel. The liquid overflow pipe suitably opens out into the second vessel at a level under the level of the second liquid overflow outlet.

A third vessel may be arranged to receive liquid from a water scrubber, which is coupled into an outlet pipe from the gas space in the cell catholyte chamber. This third vessel preferably communicates with the second vessel. The gas chamber of the scrubber suitably has a downwardly directed pipe stub opening out into the third vessel at a level under the liquid overflow outlet of the second vessel. A level-sensing means can be arranged to inhibit the operation of the cell if the liquid level in the third vessel falls below the level of the liquid overflow outlet in the second vessel.

The sensing means is preferably arranged in the liquid trap device such as to sense the liquid level on the high pressure side of the water trap device such as to inhibit the operation of the cell if the pressure level of the chlorine gas system exceeds a predetermined value. Furthermore, a sensing means can be arranged to sense the liquid level on the low pressure side of the liquid trap device such as to inhibit the operation of the cell if this level deviates, e.g. falls below the level determined by the liquid overflow outlet of the first vessel.

The invention will now be described in detail in the following with the aid of an embodiment and with reference to the accompanying drawing.

DRAWING

The drawing FIGURE schematically illustrates a chlorinating apparatus in accordance with the invention.

EMBODIMENT EXAMPLE

The apparatus generally includes the following components: an ejector device 1 for feeding chlorine gas to a water pipe 15, an electrochemical cell 2 for producing chlorine gas. A water trap device 3 with level monitors for monitoring the pressure state of the chlorine gas system. A water scrubber 5 for cleaning hydrogen gas departing from the cell. A metering device 7 for metering hydrochloric acid to the cell 2. A regulating system 100,110,120,130 for the current supply to the cell 2, and the hydrochloric acid metering by the metering device 7.

The ejector device 1 includes a water pipe 15 for water which is to be chlorinated. The pipe 15 may comprise a circulation pipe connected to a swimming baths and which also includes water filtering equipment. The pipe 15 includes shut-down valves 14 on either side of the ejector device. Between the valves 14 there is a water pump 18, an ejector 10, a shunt pipe 16, distribution valves 17, for regulating the flow 16 of the shunt pipe, and pressure gauges 11,12 on either side of the ejector for setting its suction flow.

The cell 2 includes an anolyte chamber 25 and a catholyte chamber 22 which are separated by an ion-selective diaphragm 291. Electrolyte flow through the cell 2 is established by gas generation at the electrodes 24,23. A heat exchanger 90 cools the outside of the anolyte chamber 25. The metering device 7 includes a storage vessel 71 for hydrochloric acid, a suction pipe 72 communicating with the vessel 71, a metering pump 73 in the pipe 72 and two branch pipes 74 which feed the hydrochloric acid to both cell chambers 25,22. A filling pipe 75 may be connected to the pipe 72 downstream of the pump 73 to allow initial filling of the cell electrolyte. The pump 73 is controlled via a voltage relay sensing the potential difference between the cell electrodes 23,24. In the illustrated example, the current fed from the rectifier 100 to the cell 2 is constant. At its upper part the anolyte chamber has an anolyte overflow outlet 28, communicating with a liquid trap vessel 31 via a line 290. The upper space 26 of the anolyte chamber commmunicates via a chlorine gas pipe 29 with the ejector 10. An air inlet pipe 35 takes air to the liquid trap device 3, and an air pipe 45 takes the air from the water trap device to the chlorine gas pipe 29.

The upper space 27 of the catholyte chamber 22 communicates with the scrubber 5 via a hydrogen gas pipe 58. Gas cleaned in the scrubber is taken away via a pipe 52.

Tap water is taken in by a pipe 80 with a shut-down valve 81 and a pressure regulating valve 82. The pipe 80 is branched into two branch pipes 83 and 84, each containing their respective regulating valve 85 and 86. The water pipe 83 takes the cooling water to the heat exchanger 90. The outlet pipe 91 of the heat exchanger 90 is connected to the water trap vessel 31. The water pipe 84 opens out into the upper part of the scrubber 5, and the cleaning water is connected in a collection vessel 54.

The water trap device 3 includes a closed vessel 31, having an overflow outlet 40 at a first level N1. The outlet 40 is defined by a pipe 39 opening out into a second liquid vessel 410 at a substantially lower level than the vessel 31. The air pipe 35 opens out into an air chamber 36, having a downwardly disposed pipe stub 37, opening out at a level N2 in the vessel 31 under the level N1. The chamber 36 furthermore has an outlet pipe 38 opening out into the vessel 410. The vessel 410 has an overflow outlet 42 at a level N3 which is under the level N2 and above the level at which the pipes 38 and 39 open out. The pipe 41 communicates via a pipe 47 with a de-acidifying filter 48, which may contain lime, for example. The liquid can be released to the drain 49 from the filter 48.

A monitor 44 senses the liquid level N2 in the vessel 31. A level monitor 43 senses the liquid level N1 in the vessel 31.

The scrubber 5 has a housing 51 communicating with the pipes 52 and 58. The scrubber housing 51 is downwardly provided with a pipe stub 53 opening out into the vessel 54 at a level under the level N3. The scrubber washing liquid taken in via the pipe 84 is collected in the vessel 54 and normally assumes the level N3, since the vessels 54, 410 are in mutual communication via a pipe 56. A level monitor 55 senses the water level in the vessel 54 and inhibits the operation of the cell 2 if the water level falls below the level N3 determined by the outlet 42. This can occur if the mouth of the gas outlet pipe 52 is blocked due to the formation of ice at the outlet 152.

If the suction ability of the feed device 10 becomes too low in relation to the gas flow in the pipe 29, and furthermore if the monitors 43,44 malfunction, the chlorine gas may depart via the air pipe 45, pipe stub 37, chamber 36 and pipe 35 to the outside of a wall 19 of a building accommodating the plant. Since liquid supply to the liquid trap can be assumed to continue via the lines 91,29 with the water level in the vessel 31 then falling below N1, the liquid in the vessel 31 will be forced up through the pipe stub 37 into the chamber 36, and subsequently flow down through the pipe 38 and via the overflow 42 to the de-acidifying filter 48 and further to the outlet 49.

The cell 2 is suitably placed at a level such that the liquid level of the anolyte chamber 25 is at a distance below the top of the gas space 26.

The rectifier 100 is supplied by current via a mains 101 provided with a monitor 130, which is controlled by the monitors 43,44,55 and other monitors which can be arranged to advantage in the apparatus, such as a circulation pump monitor, and further conceivable monitors such as a redox monitor and those for chlorine in the water pipe 15, temperature, hydrochloric acid and voltage. The rectifier 100 can be connected to a controlling and adjusting unit 120, which may be set for manual or automatic operation, where the automatic operation may be controlled by a time switch, redox, etc. The current lines 102, 103 to the electrodes 24 and 23 may be coupled to the voltage relay 110 controlling the metering pump 73 via the line 111. If it is assumed that the rectifier 100 delivers a constant current, the voltage between the electrodes 23,24 constitutes a measure of the concentration of the acid in the cell 2, and thus an indication of the need of addition of hydrochloric acid with a higher concentration from the store 71.

It should be noted in respect of the water trap device 3, that the vertical distance between the level N3 and the outlets in the vessel 410 of the pipes 38 and 39 must be greater than the vertical length of the pipe 37.

In the description above, the expressions "low pressure side" and "high pressure side" have been used to illustrate the relative gas pressures on both sides of the liquid trap, and here it should be understood that the pressure of the high pressure side is usually atmospheric pressure.

In the drawing the monitor unit could be controlled by the sensors 44,55,43, and also by sensors which monitor the operation of the circuclation pump, chlorine in H$_2$, red-ox, temp, HCl, voltage, for example. The unit 120 which is a control and adaptation unit can have controls to set automatic or manual operation and inputs for timer, red-ox etc.

We claim:

1. Apparatus for chlorinating a liquid such as water comprising an electrochemical cell with an anolyte chamber having an upper space and a catholyte chamber which are separated by an ion-selective diaphragm, a metering device including a conduit for supplying consumption hydrochloric acid to the cell, a hydrogen outlet means, a chlorine gas outlet from the upper space of the anolyte chamber, a chlorine gas pipe for transferring chlorine gas from the chlorine gas outlet to a pipe for the liquid which is to be chlorinated, a feed device connecting the chlorine gas pipe to the liquid pipe the feed device being disposed for generating a pressure in the chlorine gas pipe which is lower than atmospheric pressure and also a gas flow in the chlorine gas pipe which is greater than the greatest gas production flow of the cell, an atmospheric air pipe communicating with the chlorine gas pipe, via a liquid trap device which comprises a closed first vessel having a liquid chamber and means for establishing high and low pressure sides therein, a liquid overflow outlet on the low pressure side of the liquid trap device, means for feeding a liquid through the liquid chamber of the liquid trap device to, and through the overflow outlet, and sensing means for sensing the liquid level in the liquid trap device, said sensing means being adapted to inhibit chlorine production of the cell if the sensed liquid level deviates from a pre-determined level.

2. Apparatus as claimed in claim 1 wherein the upper space of the anolyte chamber has an anolyte overflow outlet communicating with the liquid chamber of the liquid trap device.

3. Apparatus as claimed in claim 1 wherein the cell further comprises a heat exchanger having a cooling liquid outlet which is adapted to have cooling liquid flowing through it, and wherein the cooling liquid outlet of the heat exchanger communicates with the liquid chamber of the liquid trap device.

4. Apparatus as claimed in claim 2 wherein the liquid trap device includes an air inlet pipe stub opening out into the vessel at a level under the liquid overflow outlet therein, and which communicates with a first part of the air inlet pipe, said first part being upstream of the liquid trap device and there being a second part of the air inlet pipe situated downstream of the liquid trap device, said second part connecting to the vessel at a level (N1) above the liquid overflow outlet therein.

5. Apparatus as claimed in claim 4 wherein the overflow outlet of the liquid trap device communicates with a pipe which opens out into a second, open vessel through which liquid flows, said second vessel being situated at a lower level than the closed first vessel wherein the second vessel has a second liquid overflow outlet, to which a de-acidifying filter is connected, wherein the first part of the air pipe has a branch pipe opening out into the second vessel at a level under the level of the second liquid overflow outlet and wherein the liquid overflow pipe of the first vessel opens out into the second vessel at a level under the level (N3) of the second liquid overflow oulet.

6. Apparatus as claimed in claim 5 further comprising a third vessel receiving liquid from a scrubber coupled into an outlet pipe from the upper volume of the cell catholyte chamber, said third vessel communicating with the second vessel and a gas housing of the scrubber having a downwardly directed pipe stub opening out into the third vessel at a level under the second liquid overflow outlet and there further being a level sensing means adapted to inhibit operation of the cell if the liquid level in the third vessel falls below the level (N3) of the second liquid overflow outlet.

7. Apparatus as claimed in claim 1 wherein the sensing means of the liquid trap device includes a monitor which senses the liquid level on the high pressure side of the device, and which inhibits the cell if the sensed level rises above a predetermined level (N2).

8. Apparatus as claimed in claim 1 wherein the sensing means of the water trap device includes a monitor sensing the liquid level on the low pressure side of the device and which inhibits the cell if the sensed level deviates from a predetermined level (N1).

9. Apparatus as claimed in claim 8 wherein the monitor sensing the liquid level on the low pressure side is arranged to inhibit the cell if the sensed level exceeds the predetermined level (N1).

10. Apparatus as claimed in claim 8 wherein the monitor sensing the liquid level of the low pressure side is adapted to inhibit the cell if the sensed level falls below the predetermined level (N1).

11. Apparatus as claimed in claim 2 wherein the cell further comprises a heat exchanger, which is adapted to have cooling liquid flowing through it, and wherein the cooling liquid outlet of the heat exchanger communicates with the liquid chamber of the water trap device.

12. Apparatus as claimed in claim 3 wherein the liquid trap device includes an air inlet pipe stub opening out into the vessel at a level (N2) under the liquid overflow outlet therein, and which communicates with a first part of the air inlet pipe, said first part being upstream of the liquid trap device and there being a second part of the air inlet pipe situated downstream of the liquid trap device, said second part connecting to the vessel at a level (N1) above the liquid overflow outlet therein.

13. Apparatus as claimed in claim 11 wherein the liquid trap device includes an air inlet pipe stub opening out into the vessel at a level (N2) under the liquid overflow outlet therein, and which communicates with a first part of the air inlet pipe, said first part being upstream of the liquid trap device and there being a second part of the air inlet pipe situated downstream of the liquid trap device, said second part connecting to the vessel at a level (N1) above the liquid overflow outlet therein.

14. Apparatus as claimed in claim 2 wherein the sensing means of the liquid trap device includes a monitor which senses the liquid level on the high pressure side of the device, and which inhibits the cell if the sensed level rises above a predetermined level (N2).

15. Apparatus as claimed in claim 3 wherein the sensing means of the liquid trap device includes a monitor which senses the liquid level on the high pressure side of the device, and which inhibits the cell if the sensed level rises above a predetermined level (N2).

16. Apparatus as claimed in claim 4 wherein the sensing means of the liquid trap device includes a monitor which senses the liquid level on the high pressure side of the device, and which inhibits the cell if the sensed level rises above a predetermined level (N2).

17. Apparatus as claimed in claim 5 wherein the sensing means of the liquid trap device includes a monitor which senses the liquid level on the high pressure side of the device, and which inhibits the cell if the sensed level rises above a predetermined level (N2).

18. Apparatus as claimed in claim 6 wherein the sensing means of the liquid trap device includes a monitor which senses the liquid level on the high pressure side of the device, and which inhibits the cell if the sensed level rises above a predetermined level (N2).

19. Apparatus as claimed in claim 2 wherein the sensing means of the water trap device includes a monitor sensing the liquid level on the low pressure side of the device and which inhibits the cell if the sensed level deviates above a predetermined level (N1).

20. Apparatus as claimed in claim 9 wherein the monitor sensing the liquid level of the low pressure side is adapted to inhibit the cell if the sensed level falls below the predetermined level (N1).

* * * * *